United States Patent [19]

Sakamoto

[11] Patent Number: 4,511,989
[45] Date of Patent: Apr. 16, 1985

[54] LINEAR INTERPOLATING METHOD AND COLOR CONVERSION APPARATUS USING THIS METHOD

[75] Inventor: Takashi Sakamoto, Kyoto, Japan

[73] Assignee: Dainippon Screen Seizo Kabushiki Kaisha, Kyoto, Japan

[21] Appl. No.: 378,792

[22] Filed: May 17, 1982

[30] Foreign Application Priority Data

Jun. 18, 1981 [JP] Japan ................................. 56-93013

[51] Int. Cl.³ ........................................... G06F 15/353
[52] U.S. Cl. .................................. 364/723; 358/160; 358/280
[58] Field of Search ................ 364/723, 577; 358/160, 358/280; 340/728; 382/41

[56] References Cited

U.S. PATENT DOCUMENTS

| | | | |
|---|---|---|---|
| 3,412,240 | 11/1968 | Hunt et al. | 364/723 |
| 3,862,404 | 1/1975 | Fiedrich | 364/723 |
| 4,354,243 | 10/1982 | Ryan et al. | 364/723 |
| 4,402,012 | 8/1983 | Knight | 358/160 |

*Primary Examiner*—David H. Malzahn
*Attorney, Agent, or Firm*—Yuter, Rosen & Dainow

[57] ABSTRACT

A linear interpolating method and apparatus for signals in a memory wherein first signals are converted into second signals by addressing in at least four-dimensional fashion, for use in a color picture processing machine such as a color scanner, a color facsimile, a color T.V. monitor, and other signal processing machine converting coordinates of signals with at least four variables, are disclosed. The second signals corresponding to certain stepped values of the first signals are read out of the memory, and then the values of the read signals are interpolated at an interpolation point positioned therebetween. At least four-dimensional interpolation unit space is divided into at least four-dimensional dissection spaces, and then it is discriminated which of the dissection spaces includes the interpolation point. Then, the interpolated value at the interpolation point is obtained as a weighted sum of the values at the vertices of the discriminated dissection space.

6 Claims, 4 Drawing Figures

LINEAR INTERPOLATING METHOD AND COLOR CONVERSION APPARATUS USING THIS METHOD

BACKGROUND OF THE INVENTION

The present invention relates to a linear interpolating method for signals in a memory in which first signals are converted into second signals by addressing in at least a four-dimensional fashion, for use in a color picture processing machine such as a digital color scanner, a color facsimile, a color T.V. monitor, and other signal processing machines by converting coordinates of signals including at least four variables. The present invention can be effectively utilized when color separation signals of subtractive primary colors such as cyan C, magenta M, yellow Y and black K for printing inks are converted into color separation signals of additive primary colors such as red R, green G and blue B for reproducing a color image on a color cathode ray tube monitor or a color film.

Usually, in multicolor printing, the primary color inks for cyan C, magenta M, yellow Y and black K, which is used for improving the contrast of the dark part, are used. However, since the spectral characteristics of these color inks are usually different or shifted from those of the ideal subtractive primary colors, color separation picture signals of subtractive primary colors, C, M and Y can not be simply converted into color separation picture signals of additive primary colors R, G and B. That is, when an original picture is reproduced according to the simply converted picture signals, the desired colors can not be obtained and the obtained colors differ from those of the printed matter.

In addition to such differences of the spectral characteristics of the inks from the ideal primary color inks, a problem occurs when the picture is printed by overlapping the different color inks. That is, when the different color inks are printed, the density of the printed matter which is printed by the different color inks is lower than that of the sum of the densities of the different color inks, which is the so-called "addition law failure".

A method for carrying out the conversion from the subtractive primary signals for C, M, Y and K colors to the additive primary signals for R, G and B colors by analog signal processing considering these facts, has been proposed, as disclosed in Japanese Laid-Open Patent Specification No. 53-49503 (Japanese Patent Application No. 51-123795 issued May 6, 1983).

In this method, when such a signal conversion is performed, the calculations for the R, G and B color densities of the printed matters printed by the single color ink C, M, Y or K, the expected color densities of the printed matter printed by the color inks, correction values against the addition law failure, and correction values against the gamma characteristics of a color monitor can be carried out quickly by an analog method. However, when these calculations are replaced simply by a digital process which possesses the stability and the operativity, it takes a lot of time to process the operation, which is not practicable.

When the printing conditions are the same, a combination of picture signals for cyan C, magenta M, yellow Y and black K correspond unconditionally to a combination of picture signals for red R, green G and blue B. Accordingly, a conversion table for converting the combination of picture signals for C, M Y and K colors into the combination of picture signals for R, G and B colors is prepared and stored in a memory in advance, and then this table memory is utilized as occasion demands, with the result that the processing speed is largely raised.

This conversion method is very effective when the gradation of the picture signal for each C, M, Y or K color is rough, but when the gradation becomes fine, the table memory requires a large capacity.

For example, when the gradation of the signal for C, M, Y or K color is 256 steps, the table memory requires $256^4 = 2^{32} = 4 \times 10^9 = 4$ giga addresses, each address storing data for 256 gradation steps of R, G or B picture signal. Thus, a large memory is necessary, which is not practicable.

Then, in order to save the capacity of the memory, a memory which stores the data of R, G and B picture signals for the combinations (16 gradation steps) of the upper four bits of C, M, Y and K picture signals, each being represented in 256 gradation steps corresponding to eight bits, is prepared, and the skipped parts are obtained by a linear interpolation method using the data of the lower four bits of C, M, Y and K picture signals, thereby obtaining R, G and B picture signals having the desired accuracy.

In this case, the table memory is provided with $16^4 = 2^{16} = 65{,}536$ addresses, each storing the four bit data for 16 gradation steps of R, G and B picture signals. In the interpolation operation, the obtained values should be continuous not only in each interpolation section but also between the adjacent interpolation sections.

Figure 1:
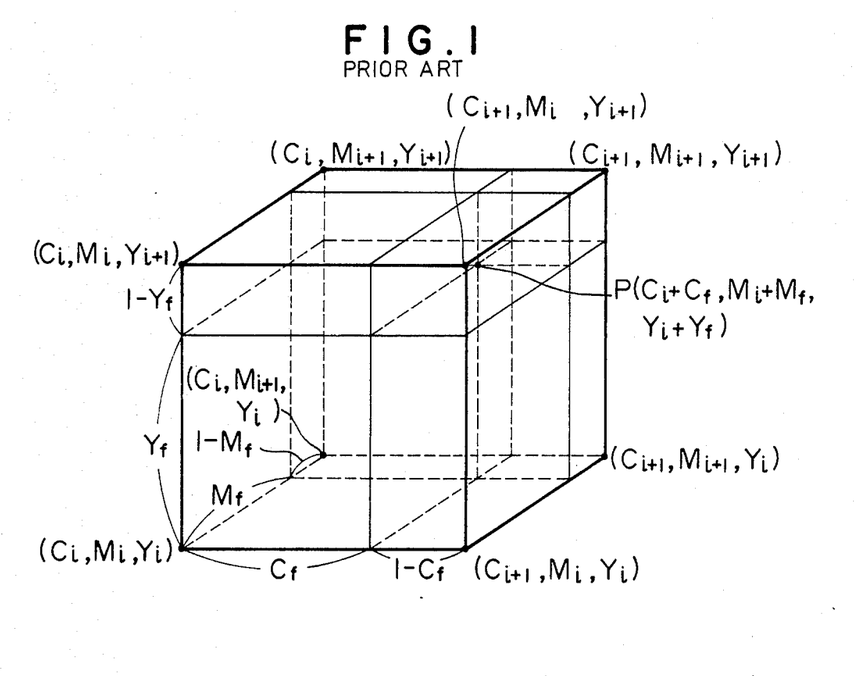
FIGS. 1 and 2 are schematic views of cubic interpolation units used in a conventional three-dimensional interpolating method.

In FIG. 1 there is shown an interpolation cube unit with eight vertices having coordinates $(C_i, M_i, Y_i)$, $(C_{i+1}, M_i, Y_i)$, $(C_i, M_{i+1}, Y_i)$, $(C_i, M_i, Y_{i+1})$, $(C_{i+1}, M_{i+1}, Y_i)$, $(C_{i+1}, M_i, Y_{i+1})$, $(C_i, M_{i+1}, Y_{i+1})$ and $(C_{i+1}, M_{i+1}, Y_{i+1})$, and a point P having coordinates $C_i + C_f$, $M_i + M_f$, $Y_i + Y_f$ at which the value $U(C, M, Y)$ is to be interpolated, and wherein $C_i$, $M_i$ and $Y_i$ representing integral parts correspond to the upper four bits of the eight bit picture signals for C, M and Y colors and $C_f$, $M_f$ and $Y_f$ representing decimal parts correspond to the lower four bits of the same.

The cube unit is divided up into eight rectangular parallelepipeds by three planes which include the point P and are parallel to its faces. The value $U(C, M, Y,)$ at the point P is obtained by adding up the values obtained by multiplying each known value at each of the vertices of the cube unit by the volume of each rectangular parallelepiped which is positioned opposite to that vertex, thereby obtaining the following formula (I), wherein $1 > C_f, M_f, Y_f \geq 0$:

$$\begin{aligned}
U(C, M, Y,) =\ & U(C_i + C_f, M_i + M_f, Y_i + Y_f) \qquad (I) \\
=\ & U(C_i, M_i, Y_i)(1 - C_f)(1 - M_f)(1 - Y_f) + \\
& U(C_{i+1}, M_i, Y_i) \cdot C_f \cdot (1 - M_f)(1 - Y_f) + \\
& U(C_i, M_{i+1}, Y_i)(1 - C_f) \cdot M_f \cdot (1 - Y_f) + \\
& U(C_i, M_i, Y_{i+1})(1 - C_f)(1 - M_f) \cdot Y_f + \\
& U(C_i, M_{i+1}, Y_{i+1})(1 - C_f) \cdot M_f \cdot Y_f + \\
& U(C_{i+1}, M_i, Y_{i+1}) \cdot C_f \cdot (1 - M_f) \cdot Y_f + \\
& U(C_{i+1}, M_{i+1}, Y_i) \cdot C_f \cdot M_f \cdot (1 - Y_f) + \\
& U(C_{i+1}, M_{i+1}, Y_{i+1}) \cdot C_f \cdot M_f \cdot Y_f
\end{aligned}$$

In this interpolation method of the formula I, the obtained values are continuous not only in each interpolation section but also between the adjacent interpolation sections. Further, it is clear that the value obtained in the center of each face of the cube unit is the mean value of the known values at each vertex of that face and the value obtained at the center of the cube is the mean value of the eight known values at the vertices of the cube. Accordingly, this method is mathematically reasonable.

It seems proper that this interpolation method expressed by the formula I can be extensively applicable to interpolate the combination of R, G and B picture signal data stored in the table memory, which corresponds to the combination of $C_i$, $M_i$, $Y_i$ and $K_i$ which are represented by the upper four bits of the combination of the eight bit picture signals for C, M, Y and K colors, as follows.

$$U(C,M,Y,K) = \quad (II)$$

$$U(C_i, M_i, Y_i, K_i)(1-C_f)((1-M_f)(1-Y_f)(1-K_f) +$$

$$U(C_{i+1}, M_i, Y_i, K_i) \cdot C_f(1-M_f)(1-Y_f)(1-K_f) +$$

$$U(C_i, M_{i+1}, Y_i, K_i)(1-C_f) \cdot M_f(1-Y_f)(1-K_f) +$$

$$U(C_i, M_i, Y_{i+1}, K_i)(1-C_f)(1-M_f) \cdot Y_f(1-K_f) +$$

$$U(C_i, M_i, Y_i, K_{i+1})(1-C_f)(1-M_f)(1-Y_f) \cdot K_f +$$

$$U(C_{i+1}, M_{i+1}, Y_i, K_i) \cdot C_f M_f (1-Y_f)(1-K_f) +$$

$$U(C_{i+1}, M_i, Y_{i+1}, K_i) \cdot C_f(1-M_f) \cdot Y_f(1-K_f) +$$

$$U(C_{i+1}, M_i, Y_i, K_{i+1}) \cdot C_f(1-M_f)(1-Y_f) \cdot K_f +$$

$$U(C_i, M_{i+1}, Y_{i+1}, K_i)(1-C_f) \cdot M_f Y_f (1-K_f) +$$

$$U(C_i, M_{i+1}, Y_i, K_{i+1})(1-C_f) \cdot M_f (1-Y_f) \cdot K_f +$$

$$U(C_i, M_i, Y_{i+1}, K_{i+1})(1-C_f)(1-M_f) \cdot Y_f K_f +$$

$$U(C_{i+1}, M_{i+1}, Y_{i+1}, K_i) \cdot C_f M_f Y_f (1-K_f) +$$

$$U(C_{i+1}, M_{i+1}, Y_i, K_{i+1}) \cdot C_f M_f (1-Y_f) \cdot K_f +$$

$$U(C_{i+1}, M_i, Y_{i+1}, K_{i+1}) \cdot C_f (1-M_f) \cdot Y_f K_f +$$

$$U(C_i, M_{i+1}, Y_{i+1}, K_{i+1})(1-C_f) \cdot M_f Y_f K_f +$$

$$U(C_{i+1}, M_{i+1}, Y_{i+1}, K_{i+1}) \cdot C_f M_f Y_f K_f$$

In this interpolation method expressed by the formula II, the obtained values are continuous not only in each interpolation section but also between the adjacent interpolation sections. However, this interpolation method involves 16 terms to be multiplied, and four multiplications for each term of the fifth dimension. Therefore, this method requires a complicated arithmetic circuit which has high cost, and slows the quickness of the processing operation.

Further, although, in this method, values which are smoothly continuous between the adjacent interpolation sections are obtained, the variations or the differential values of the interpolated values often become largely discontinuous. Similar disadvantages and inconveniences are found in the three-dimensional conversion according to the formula I.

In order to remove these disadvantages and inconveniences, a three-dimensional interpolation method has been proposed, as disclosed in Japanese Laid-Open Patent Specification No. 53-123201 (Japanese Patent Application No. 52-37198 issued Oct. 27, 1983). This method will be described in connection with FIGS. 2 and 3.

Figure 2:
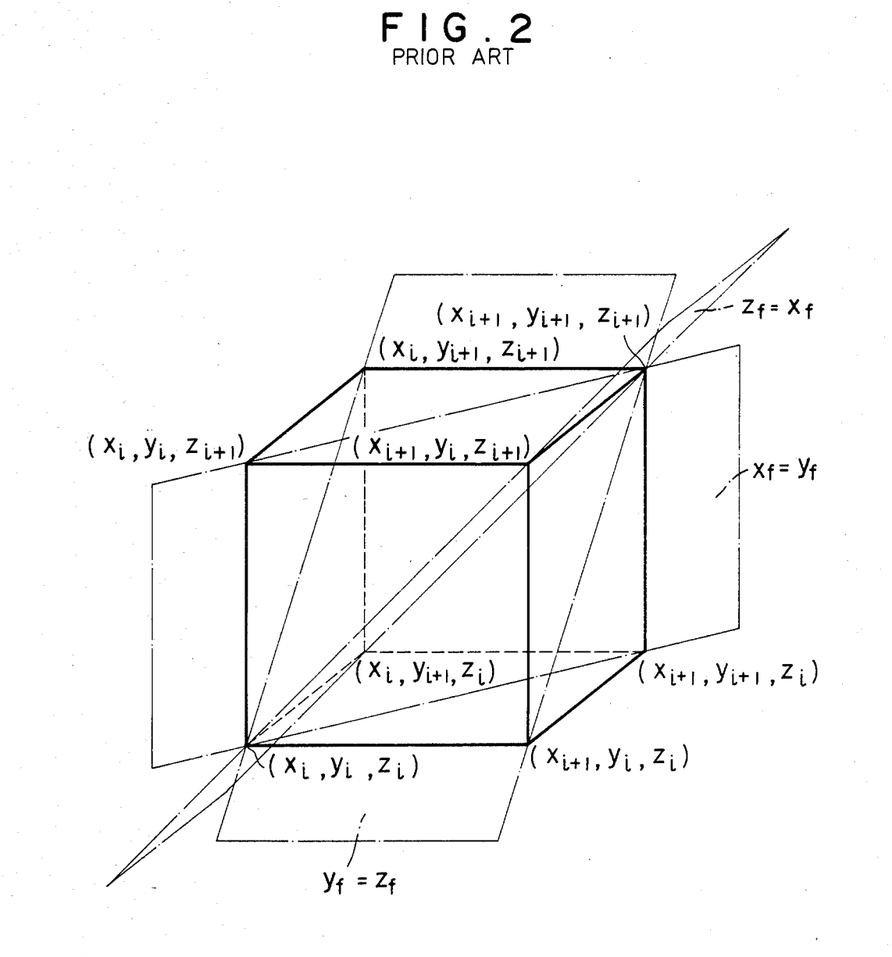

In FIG. 2 there is shown a dissection of a cube unit with eight vertices having coordinates $(x_i,y_i,z_i)$, $(x_{i+1},y_i,z_i)$, $(x_i,y_{i+1},z_i)$, $(x_i,y_i,z_{i+1})$, $(x_{i+1},Y_{i+1},z_i)$, $(x_{i+1},y_i,z_{i+1})$, $(x_i,y_{i+1},z_{i+1})$ and $(x_{i+1},y_{i+1},z_{i+1})$, which is dissected into six tetrahedra by three planes $x_f=y_f$, $y_f=z_f$, and $z_f=x_f$ which include the vertices $(x_i,y_i,z_i)$, $(x_{i+1},y_{i+1},z_i)$, $(x_i,y_i,z_{i+1})$ and $(x_{i+1},y_{i+1},z_{i+1})$; the vertices $(x_i,y_i,z_i)$, $(x_{i+1},y_i,z_i)$, $(x_{i+1},y_{i+1},z_{i+1})$ and $(x_i,y_{i+1},z_{i+1})$; and the vertices $(x_i,y_i,z_i)$, $(x_{i+1},y_i,z_{i+1})$, $(x_{i+1},y_{i+1},z_{i+1})$ and $(x_i,y_{i+1},z_i)$, respectively.

Figure 3:
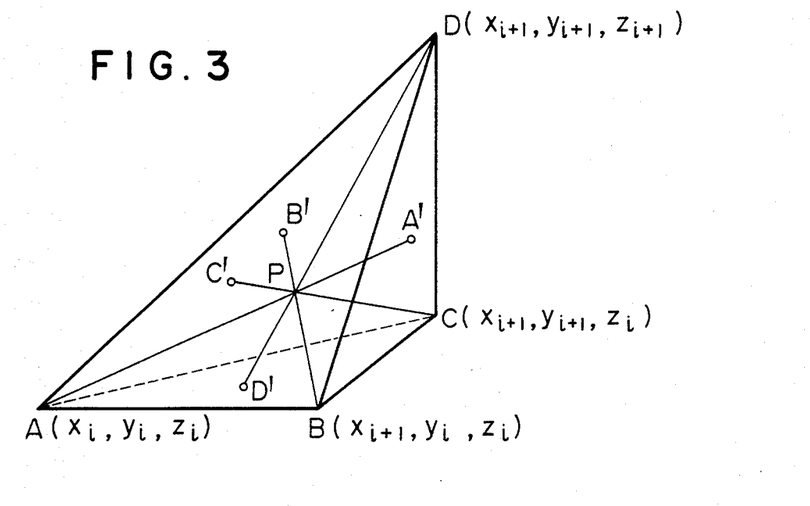
FIG. 3 is a schematic view of one of the tetrahedra obtained by the dissection of FIG. 2.

Now, a point P to be interpolated, having the coordinates $(x_i+x_f, y_i+y_f, z_i+z_f)$, lies within the tetrahedron ABCD with the coordinates $(x_i,y_i,z_i)$, $(x_{i+1},y_i,z_i)$, $(x_{i+1},y_{i+1},z_i)$ and $(x_{i+1},y_{i+1},z_{i+1})$ under the conditions that $1 > x_f \geq y_f \geq z_f \geq 0$, as shown in FIG. 3.

In this case, the value $U(x,y,z)$ at the point P is calculated as follows: draw lines from each vertex A, B, C and D through the point P to meet the opposite sides of the tetrahedron ABCD in A', B', C' and D'. The values $U(x_i,y_i,z_i)$, $U(x_{i+1},y_i,z_i)$, $U(x_{i+1},y_{i+1},z_i)$ and $U(x_{i+1},y_{i+1},z_{i+1})$ at the vertices A, B, C and D are known. Then, the interpolated value U(P) is equal to $$U(x,y,z) = U(x_i + x_f, y_i + y_f, z_i + z_f) \quad (III)$$

$$= U(x_i,y_i,z_i) \cdot \frac{\overline{PA'}}{\overline{AA'}} + U(x_{i+1},y_i,z_i) \cdot \frac{\overline{PB'}}{\overline{BB'}} +$$

$$U(x_{i+1},y_{i+1},z_i) \cdot \frac{\overline{PC'}}{\overline{CC'}} + U(x_{i+1},y_{i+1},z_{i+1}) \cdot \frac{\overline{PD'}}{\overline{DD'}}$$

$$= U(x_i,y_i,z_i)(1-x_f) + U(x_{i+1},y_i,z_i)(x_f-y_f) +$$

$$U(x_{i+1},y_{i+1},z_i)(y_f-z_f) + U(x_{i+1},y_{i+1},z_{i+1}) \cdot x_f$$

Similar discriminating conditions and calculating factors can be worked out for the other five tetrahedra. Table 1 shows a complete set of the discrimination conditions and calculating factors for the interpolations. It is readily appreciated that this calculation method is easier than the method of formula I, although at a slight loss in accuracy. Further, in this method, there is no danger that the interpolated values may be discontinuous not only in each interpolation section but also between the adjacent interpolation sections.

In Formula III, the weighting factors for the known values of the vertices A, B, C and D of the tetrahedron ABCD are shown by the ratios of the edges of the tetrahedron ABCD shown in FIG. 3 when the linear interpolation is carried out by using the known values of the vertices A, B, C and D. However, since the ratios $$\frac{\overline{PA'}}{\overline{AA'}} \text{ and } \frac{\overline{PB'}}{\overline{BB'}}$$

correspond to the ratios $$\frac{PBCD}{ABCD} \text{ and } \frac{PCDA}{ABCD}$$

of the volumes of the tetrahedra, respectively, the ratios of the edges of the tetrahedron can be replaced with the ratios of the volumes of the tetrahedra.

SUMMARY OF THE INVENTION

It is an object of the present invention to provide a linear interpolating method for signals in a memory in which first signals are converted into second signals by addressing in at least a four-dimensional fashion, for use in a color picture processing machine such as a digital color scanner, a color facsimile, a color T.V. monitor, and other signal processing machines by converting coordinates of signals including at least four variables, free from the aforementioned disadvantages and inconveniences, which is capable of performing quick processing and is simple in operation.

It is another object of the present invention to provide an apparatus for carrying out a linear interpolating method for signals in a memory in which first signals are converted into second signals by addressing in at least a four-dimensional fashion, for use in a color picture processing machine such as a digital color scanner, a color facsimile, a color T.V. monitor, and other signal processing machines by converting coordinates of signals including at least four variables, free from the aforementioned disadvantages and inconveniences, which is simple in operation and is capable of performing a quick processing.

In order to attain these objects of the present invention, the three dimensional interpolating method described above is utilized in the four-dimensions, and so forth. However, in fact, it is very difficult to conceptualize a four-dimensional space from a three-dimensional space, and a four-dimensional interpolating method requires a jump of logic and does not lie on an extension line of the three-dimensional interpolating method.

According to the present invention there is provided a linear interpolating method for signals in a memory in which first signals are converted into second signals by addressing, for use in a color picture processing machine, comprising storing the second signals corresponding to certain stepped values of the first signals, which are read out of the memory by addressing in at least a four-dimensional fashion, and interpolating the values of the second signals at points which are positioned between said values by the following steps: dividing up at least four-dimensional imaginary interpolation unit space of the memory which is defined by a unit change of each of the first signals, into a plurality of at least four-dimensional imaginary dissection spaces whose vertices are also vertices of said imaginary interpolation unit space, discriminating which of these imaginary dissection spaces includes the interpolation point at which the value of the second signal is to be interpolated, and deriving the interpolated value at the interpolation point as a weighted sum of the values at the vertices of the discriminated imaginary dissection space, the value at each vertex being given a weight corresponding to the ratio of an at least four-dimensional second imaginary space whose vertices are the interpolation point and the other four vertices of the discriminated imaginary dissection space to the discriminated imaginary dissection space.

According to the present invention there is also provided a linear interpolating apparatus for signals in a memory in which first signals are converted into second signals by addressing a conversation table stored in memory, for use in a color picture processing machine, comprising means for storing the second signals corresponding to certain stepped values of the first signals, which are read out of the memory by addressing in at least a four-dimensional fashion, and means for interpolating the values of the second signals at points which are positioned between said values comprising the following: means for dividing up an at least four-dimensional imaginary interpolation unit space which is defined by a unit change in each of a set of first signals, into a plurality of at least four-dimensional imaginary dissection spaces whose vertices are also vertices of said imaginary interpolation unit space, means for discriminating which of these imaginary dissection spaces includes the interpolation point at which the value of the second signal is to be interpolated, and means for deriving the interpolated value at the interpolation point as a weighted sum of the second signal values at the vertices of the discriminated imaginary dissection space, the value at each vertex being given a weight corresponding to the ratio of an at least four-dimensional second imaginary space whose vertices are the interpolation point and the other four vertices of the discriminated imaginary dissection space to the discriminated imaginary dissection space.

TABLE 1

| Discrimination conditions | $U(x_i, y_i, z_i)$ | $U(x_{i+1}, y_i, z_i)$ | $U(x_i, y_{i+1}, z_i)$ | $U(x_i, y_i, z_{i+1})$ | $U(x_{i+1}, y_{i+1}, z_i)$ | $U(x_{i+1}, y_i, z_{i+1})$ | $U(x_i, y_{i+1}, z_{i+1})$ | $U(x_{i+1}, y_{i+1}, z_{i+1})$ |
|---|---|---|---|---|---|---|---|---|
| $x_f \geq y_f \geq z_f$ | $1 - x_f$ | $x_f - y_f$ | | | $y_f - z_f$ | | | $z_f$ |
| $x_f \geq z_f > y_f$ | $1 - x_f$ | $x_f - z_f$ | | | | $z_f - y_f$ | | $y_f$ |
| $z_f > x_f \geq y_f$ | $1 - x_f$ | | | $z_f - x_f$ | | $x_f - y_f$ | | $y_f$ |
| $z_f \geq y_f > x_f$ | $1 - z_f$ | | | $z_f - y_f$ | | | $y_f - x_f$ | $x_f$ |
| $y_f > z_f \geq x_f$ | $1 - y_f$ | | $y_f - z_f$ | | | | $z_f - x_f$ | $x_f$ |
| $y_f > x_f > z_f$ | $1 - y_f$ | | $y_f - x_f$ | | $x_f - z_f$ | | | $z_f$ |

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

Now, assuming that one of 24 four-dimensional imaginary dissection spaces, which can be obtained by dividing a four-dimensional imaginary interpolation unit space, is a four-dimensional imaginary dissection space ABCDE having vertices A, B, C, D and E whose respective coordinates are $(w_i, x_i, y_i, z_i)$, $(w_{i+1}, x_i, y_i, z_i)$, $(w_{i+1}, x_{i+1}, y_i, z_i)$, $(w_{i+1}, x_{i+1}, y_{i+1}, z_i)$ and $(w_{i+1}, x_{i+1}, y_{i+1}, z_{i+1})$, a point P having coordinates $(w_i + w_f, x_i + x_f, y_i + y_f, z_i + z_f)$ to be interpolated can be included in the imaginary dissection space ABCDE when $w_f \geq x_f \geq y_f \geq z_f$.

The interpolated value U(w,x,y,z) at the point P is obtained by a method similar to that of the formula III by using the known values [A], [B], [C], [D] and [E] of the vertices of the four-dimensional imaginary dissection space ABCDE in the following formula:

$$U(w,x,y,z) = U(w_i + w_f x_i + x_f y_i + y_f z_i + z_f)$$

$$= [A] \cdot \frac{\text{Space } PBCDE}{\text{Space } ABCDE} + [B] \cdot \frac{\text{Space } PCDEA}{\text{Space } ABCDE} +$$

$$[C] \cdot \frac{\text{Space } PDEAB}{\text{Space } ABCDE} + [D] \cdot \frac{\text{Space } PEABC}{\text{Space } ABCDE} +$$

$$[E] \cdot \frac{\text{Space } PABCD}{\text{Space } ABCDE}$$

In this case, the ratios of the spaces can be converted in the similar manner to the formula III, as follows:

$$\frac{\text{Space } PBCDE}{\text{Space } ABCDE} = 1 - w_f$$

$$\frac{\text{Space } PCDEA}{\text{Space } ABCDE} = w_f - x_f$$

$$\frac{\text{Space } PDEAB}{\text{Space } ABCDE} = x_f - y_f$$

$$\frac{\text{Space } PEABC}{\text{Space } ABCDE} = y_f - z_f$$

$$\frac{\text{Space } PABCD}{\text{Space } ABCDE} = z_f$$

Therefore, the interpolated value is expressed in the following formula IV.

$$U(w, x, y, z) = [A](1 - w_f) + [B](w_f - x_f) + [C](x_f - y_f) + \quad \text{(IV)}$$
$$[D](y_f - z_f) + [E]z_f$$

-continued $$= U(w_i, x_i, y_i, z_i)(1 - w_f) +$$
$$U(w_{i+1}, x_i, y_i, z_i)(w_f - x_f) +$$
$$U(w_{i+1}, x_{i+1}, y_i, z_i)(x_f - y_f) +$$
$$U(w_{i+1}, x_{i+1}, y_{i+1}, z_i)(y_f - z_f) +$$
$$U(w_{i+1}, x_{i+1}, y_{i+1}, z_{i+1})z_f$$

There are 24 variations of relative magnitudes of $w_f$, $x_f$, $y_f$ and $z_f$, which are tabulated in Table 2, i.e. the four-dimensional imaginary interpolation unit space is divided into 24 four-dimensional imaginary dissection spaces. It is readily understood that the interpolated value of each of the other 23 variations is obtained in the same manner as the formula IV.

In this embodiment, signals representing the R, G, and B picture signal data corresponding to certain stepped values of the four color separation picture signals of C, M, Y and K colors are read out of the memory by addressing the conversion table stored in memory by means of the four color separation picture signals, and then the values of the read signals are interpolated at the interpolation point positioned therebetween, as follows. That is, the four-dimensional imaginary interpolation unit space which includes the interpolation point is divided into 24 four-dimensional imaginary dissection spaces, and then it is discriminated which of these imaginary dissection spaces includes the interpolation point. Then, the interpolated value at the interpolation point is obtained as a weighted sum of the values at the vertices of the discriminated imaginary dissection space. The value at each vertex of the discriminated imaginary dissection space is given a weight corresponding to the ratio of a four-dimensional second imaginary space whose vertices are the interpolation point and the other four vertices of the discriminated imaginary dissection space to the discriminated imaginary dissection space.

TABLE 2

| | $U(w_i, x_i, y_i, z_i)$ | $U(w_{i+1}, x_i, y_i, z_i)$ | $U(w_i, x_{i+1}, y_i, z_i)$ | $U(w_i, x_i, y_{i+1}, z_i)$ | $U(w_i, x_i, y_i, z_{i+1})$ | $U(w_{i+1}, x_{i+1}, y_1, z_1)$ |
|---|---|---|---|---|---|---|
| $1 > w_f \geq x_f \geq y_f \geq z_f \geq 0$ | $1 - w_f$ | $w_f - x_f$ | | | | $x_f - y_f$ |
| $1 > w_f \geq x_f \geq z_f > y_f \geq 0$ | $1 - w_f$ | $w_f - x_f$ | | | | $x_f - y_f$ |
| $1 > w_f \geq y_f > x_f \geq z_f \geq 0$ | $1 - w_f$ | $w_f - y_f$ | | | | |
| $1 > w_f \geq y_f \geq z_f > x_f \geq 0$ | $1 - w_f$ | $w_f - y_f$ | | | | |
| $1 > w_f \geq z_f > x_f \geq y_f \geq 0$ | $1 - w_f$ | $w_f - z_f$ | | | | |
| $1 > w_f \geq z_f > y_f > x_f \geq 0$ | $1 - w_f$ | $w_f - z_f$ | | | | |
| $1 > x_f > w_f \geq y_f \geq z_f \geq 0$ | $1 - x_f$ | | $x_f - w_f$ | | | $w_f - y_f$ |
| $1 > x_f > w_f \geq z_f > y_f \geq 0$ | $1 - x_f$ | | $x_f - w_f$ | | | $w_f - z_f$ |
| $1 > x_f \geq y_f > w_f \geq z_f \geq 0$ | $1 - x_f$ | | $x_f - y_f$ | | | |
| $1 > x_f \geq y_f \geq z_f > w_f \geq 0$ | $1 - x_f$ | | $x_f - y_f$ | | | |
| $1 > x_f \geq z_f > w_f \geq y_f \geq 0$ | $1 - x_f$ | | $x_f - z_f$ | | | |
| $1 > x_f \geq z_f \geq y_f > w_f \geq 0$ | $1 - x_f$ | | $x_f - z_f$ | | | |
| $1 > y_f > w_f \geq x_f \geq z_f \geq 0$ | $1 - y_f$ | | | $y_f - w_f$ | | |
| $1 > y_f > w_f \geq z_f > x_f \geq 0$ | $1 - y_f$ | | | $y_f - w_f$ | | |
| $1 > y_f > x_f \geq w_f \geq z_f \geq 0$ | $1 - y_f$ | | | $y_f - x_f$ | | |
| $1 > y_f > x_f \geq z_f > w_f \geq 0$ | $1 - y_f$ | | | $y_f - x_f$ | | |
| $1 > y_f \geq z_f > x_f \geq w_f \geq 0$ | $1 - y_f$ | | | $y_f - z_f$ | | |
| $1 > y_f \geq z_f > w_f > x_f \geq 0$ | $1 - y_f$ | | | $y_f - z_f$ | | |
| $1 > z_f > w_f \geq x_f > y_f \geq 0$ | $1 - z_f$ | | | | $z_f - w_f$ | |
| $1 > z_f > w_f \geq y_f > x_f \geq 0$ | $1 - z_f$ | | | | $z_f - w_f$ | |
| $1 > z_f > x_f \geq w_f \geq y_f \geq 0$ | $1 - z_f$ | | | | $z_f - x_f$ | |
| $1 > z_f > x_f \geq y_f > w_f \geq 0$ | $1 - z_f$ | | | | $z_f - x_f$ | |
| $1 > z_f > y_f \geq w_f \geq x_f \geq 0$ | $1 - z_f$ | | | | $z_f - y_f$ | |
| $1 > z_f > y_f > x_f > w_f \geq 0$ | $1 - z_f$ | | | | $z_f - y_f$ | |

| | $U(w_{i+1}, x_i, y_{i+1}, z_i)$ | $U(w_{i+1}, x_i, y_i, z_{i+1})$ | $U(w_i, x_{i+1}, y_{i+1}, z_1)$ | $U(w_i, x_{i+1}, y_i, z_{i+1})$ | $U(w_i, x_i, y_{i+1}, z_{i+1})$ |
|---|---|---|---|---|---|
| $1 > w_f \geq x_f \geq y_f \geq z_f \geq 0$ | | | | | |
| $1 > w_f \geq x_f \geq z_f > y_f \geq 0$ | | | | | |
| $1 > w_f \geq y_f > x_f \geq z_f \geq 0$ | $y_f - x_f$ | | | | |
| $1 > w_f \geq y_f \geq z_f > x_f \geq 0$ | $y_f - z_f$ | | | | |

TABLE 2-continued

| | | |
|---|---|---|
| $1 > w_f \geq z_f > x_f \geq y_f \geq 0$ | | $z_f - x_f$ |
| $1 > w_f \geq z_f > y_f > x_f \geq 0$ | | $z_f - y_f$ |
| $1 > x_f > w_f \geq y_f \geq z_f \geq 0$ | | |
| $1 > x_f > w_f \geq z_f > y_f \geq 0$ | | |
| $1 > x_f \geq y_f > w_f \geq z_f \geq 0$ | $y_f - w_f$ | |
| $1 > x_f \geq y_f \geq z_f > w_f \geq 0$ | $y_f - z_f$ | |
| $1 > x_f \geq z_f > w_f \geq y_f \geq 0$ | | $z_f - w_f$ |
| $1 > x_f \geq z_f \geq y_f > w_f \geq 0$ | | $z_f - y_f$ |
| $1 > y_f > w_f \geq x_f \geq z_f \geq 0$ | $w_f - x_f$ | |
| $1 > y_f > w_f \geq z_f > x_f \geq 0$ | $w_f - z_f$ | |
| $1 > y_f > x_f \geq w_f \geq z_f \geq 0$ | $x_f - w_f$ | |
| $1 > y_f > x_f \geq z_f > w_f \geq 0$ | $x_f - z_f$ | |
| $1 > y_f \geq z_f > x_f \geq w_f \geq 0$ | | $z_f - x_f$, $z_f - w_f$ |
| $1 > y_f \geq z_f > w_f > x_f \geq 0$ | | |
| $1 > z_f > w_f \geq x_f > y_f \geq 0$ | $w_f - x_f$ | |
| $1 > z_f > w_f \geq y_f > x_f \geq 0$ | $w_f - y_f$ | |
| $1 > z_f > x_f \geq w_f \geq y_f \geq 0$ | $x_f - w_f$ | |
| $1 > z_f > x_f \geq y_f > w_f \geq 0$ | $x_f - y_f$ | |
| $1 > z_f > y_f \geq w_f \geq x_f \geq 0$ | | $y_f - w_f$, $y_f - x_f$ |
| $1 > z_f > y_f > x_f \geq x_f \geq 0$ | | |

| | $U(w_{i+1}, x_{i+1}, y_{i+1}, z_i)$ | $U(w_{i+1}, x_{i+1}, y_i, z_{i+1})$ | $U(w_{i+1}, x_i, y_{i+1}, z_{i+1})$ | $U(w_i, x_{i+1}, y_{i+1}, z_{i+1})$ | $U(w_{i+1}, x_{i+1}, y_{i+1}, z_{i+1})$ |
|---|---|---|---|---|---|
| $1 > w_f \geq x_f \geq y_f \geq z_f \geq 0$ | $y_f - z_f$ | | | | $z_f$ |
| $1 > w_f \geq x_f \geq z_f > y_f \geq 0$ | | $z_f - y_f$ | | | $y_f$ |
| $1 > w_f \geq y_f > x_f \geq z_f \geq 0$ | $x_f - z_f$ | | | | $z_f$ |
| $1 > w_f \geq y_f \geq z_f > x_f \geq 0$ | | | $z_f - x_f$ | | $x_f$ |
| $1 > w_f \geq z_f > x_f \geq y_f \geq 0$ | | $x_f - y_f$ | | | $y_f$ |
| $1 > w_f \geq z_f > y_f > x_f \geq 0$ | | | $y_f - x_f$ | | $x_f$ |
| $1 > x_f > w_f \geq y_f \geq z_f \geq 0$ | $y_f - z_f$ | | | | $z_f$ |
| $1 > x_f > w_f \geq z_f > y_f \geq 0$ | | $z_f - y_f$ | | | $y_f$ |
| $1 > x_f \geq y_f > w_f \geq z_f \geq 0$ | $w_f - z_f$ | | | | $z_f$ |
| $1 > x_f \geq y_f \geq z_f > w_f \geq 0$ | | | | $z_f - w_f$ | $w_f$ |
| $1 > x_f \geq z_f > w_f \geq y_f \geq 0$ | | $w_f - y_f$ | | | $y_f$ |
| $1 > x_f \geq z_f \geq y_f > w_f \geq 0$ | | | | $y_f - w_f$ | $w_f$ |
| $1 > y_f > w_f \geq x_f \geq z_f \geq 0$ | $x_f - z_f$ | | | | $z_f$ |
| $1 > y_f > w_f \geq z_f > x_f \geq 0$ | | $z_f - x_f$ | | | $x_f$ |
| $1 > y_f > x_f \geq w_f \geq z_f \geq 0$ | $w_f - z_f$ | | | | $z_f$ |
| $1 > y_f \geq x_f \geq z_f > w_f \geq 0$ | | | | $z_f - w_f$ | $w_f$ |
| $1 > y_f \geq z_f > x_f \geq w_f \geq 0$ | | | | $x_f - w_f$ | $w_f$ |
| $1 > y_f \geq z_f > w_f > x_f \geq 0$ | | | $w_f - x_f$ | | $x_f$ |
| $1 > z_f > w_f \geq x_f > y_f \geq 0$ | | $x_f - y_f$ | | | $y_f$ |
| $1 > z_f > w_f \geq y_f > x_f \geq 0$ | | | $y_f - x_f$ | | $x_f$ |
| $1 > z_f > x_f \geq w_f \geq y_f \geq 0$ | | $w_f - y_f$ | | | $y_f$ |
| $1 > z_f > x_f \geq y_f > w_f \geq 0$ | | | | $y_f - w_f$ | $w_f$ |
| $1 > z_f > y_f \geq w_f \geq x_f \geq 0$ | | $w_f - x_f$ | | | $x_f$ |
| $1 > z_f > y_f > x_f \geq x_f \geq 0$ | | | | $x_f - w_f$ | $w_f$ |

It is clear that the calculation is far simpler in practice than the method of the above-mentioned formula II. Further, in this method, the discontinuities across the borders between one unit space and the next are much reduced.

Figure 4:
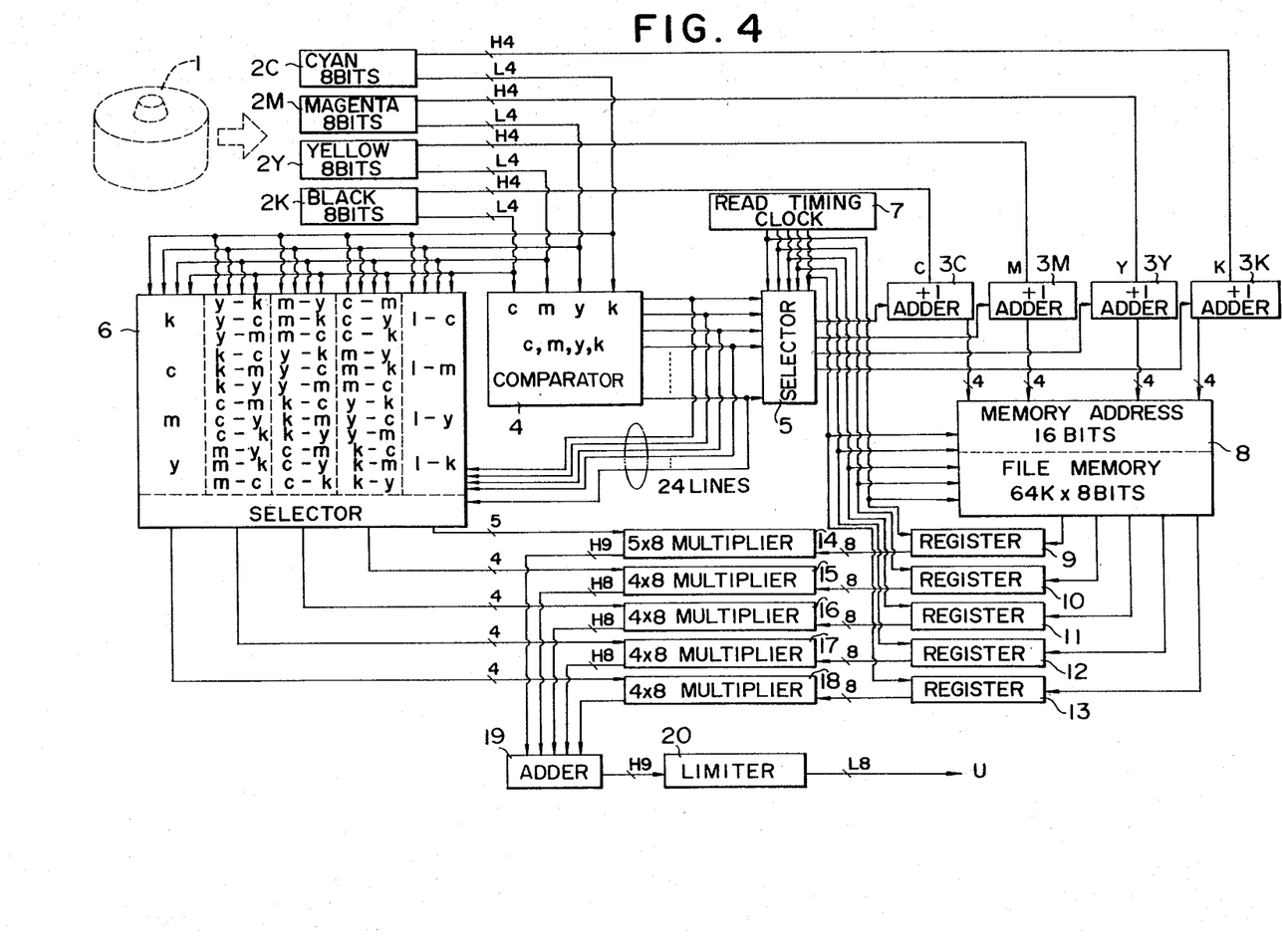
FIG. 4 shows a block diagram of one embodiment of an apparatus for carrying out a four-dimensional linear interpolating method according to the present invention.

FIG. 4 shows a block diagram of one embodiment of an apparatus which carries out the four-dimensional linear interpolating method described above according to the present invention.

A combination of four color-controlled color separation digital picture signals of 8-bit binary codes for subtractive primary colors such as cyan, magenta, yellow and black are read out of a disk 1 of a memory (not shown) to signal sources 2C, 2M, 2Y and 2K in which each of the color separation picture signals is divided into higher 4-bit signals C, M, Y and K and lower 4-bit signals c, m, y and k.

With respect to all combinations of the higher 4-bit color separation signals C, M, Y and K ($2^4 \times 2^4 \times 2^4 \times 2^4 = 65,536$), each of the other color separation signals of additive primary colors such as red R, green G and blue B for reproducing a color image on a color cathode ray tube monitor or a color film is previously prepared therefor and is stored as a conversion table in a memory 8. In this case, the capacity of the memory 8 may be far reduced with reference to the conventional method, as described above. At this time, for finer combinations, including the lower 4-bit signals, the additive R, G and B color separation signals are partially prepared, i.e. very insufficiently, so that additional additive color separation signals are obtained by the interpolating method to be used for compensating therefor according to the present invention.

The higher 4-bit color separation signals C, M, Y and K are sent to adders 3C, 3M, 3Y and 3K, respectively, and the lower 4-bit color separation signals c, m, y and k are sent to a comparator 4 in which the relations in magnitude among these signals c, m, y and k are compared. Twenty-four cases can be anticipated in the resultant comparisons, and any one output signal is fed into a selector 5 and a coefficient selector 6. The lower 4-bit signals are sent to the selector 6.

In the selector 5, any one signal entered is accessed five times by a read timing clock 7, and depending on the output signal from the comparator 4, the decision as to which higher 4-bit signals C, M, Y and K "1" should be added is made. Each of the outputs of the selector 5 is input to the respective adders 3C, 3M, 3Y and 3K.

Respective adders 3C, 3M, 3Y and 3K are connected to the memory 8 in which all the additive color separation signals of 8-bit binary codes, corresponding to each of all combinations of the higher 4-bit signals are previously stored. The memory 8 is connected with five registers 9, 10, 11, 12 and 13 via data lines. These registers 9-13 are adapted to store the additive color separation signals which are accessed according to clock signals generated by the read timing clock 7.

In the memory 8, at the first time, irrespective of magnitude among the lower 4-bit signals c, m, y and k, the additive color separation signals of 8-bit binary codes corresponding to those addresses of C, M, Y and K are accessed so as to be stored in the first register 9. Next, as the second time, "1" is added to any one of the higher addresses corresponding to the signal having the largest value among those of c, m, y and k. In such a case of $c \geq m \geq y \geq k$, $c \geq m \geq k > y$, $c \geq y > m \geq k$, $c \geq y \geq k > m$, $c \geq k > m \geq y$ or $c \geq k > y > m$, that is, wherein c is the maximum, "1" should be added only to the address of C, and then the additive color separation signal of address C+1, M, Y and K is accessed and stored in the second register 10.

At the third time, "1" is added to two of the higher addresses corresponding to those of the largest and the next larger one, that is, when there is relation of $c \geq m \geq y \geq k$, $c \geq m \geq k > y$, $m > c \geq y \geq k$, or $m > c \geq k > y$, among those values of c, m, y and k, the additive color separation signal of address C+1, M+1, Y and K is accessed, and in case of there being relations of $c \geq y > m \geq k$, $c \geq y \geq k > m$, $y > c \geq m \geq k$ and $y > c \geq k > m$, the additive color separation signal having the C+1, M, Y+1, K address is accessed and stored in the third register 11. At the fourth time, "1" is added to three of the higher addresses corresponding to those of the largest, the next larger one and the third larger one, that is when there is relation of $c \geq m \geq y \geq k$, $c \geq y > m \geq k$, $m > c \geq y \geq k$, $m \geq y > c \geq k$, $y > c \geq m \geq k$ or $y \geq m \geq c \geq k$, among those values of c, m, y and k, the additive color separation signal of address C+1, M+1, Y+1 and K is accessed and stored in the fourth register 12. At the fifth access time, to all higher addresses "1" is added, and the additive color separation signal of address C+1, M+1, Y+1 and K+1 is accessed so as to be stored in the fifth register 13. While the lower 4-bit signals are fed to the selector 6, and 5 sets of coefficient signals such as $(1-c, 1-m, 1-y, 1-k)$, $(c-m, c-y, c-k, m-y, m-k, m-c, y-k, y-c, y-m, k-c, k-m, k-y)$, $(m-y, m-k, m-c, y-k, y-c, y-m, k-c, k-m, k-y, c-m, c-y, c-k)$, $(y-k, y-c, y-m, k-c, k-m, k-y, c-m, c-y, c-k, m-y, m-k, m-c)$ and $(k, c, m, y)$ are calculated. The relation among the relative magnitudes of the lower 4-bit signals, the access times and the coefficient signals are tabulated in Table 3.

TABLE 3

| | U(C + ΔC, M + ΔM, Y + ΔY, K + ΔK) TIMING | | | | | | | | | | | | | | | |
|---|---|---|---|---|---|---|---|---|---|---|---|---|---|---|---|---|
| | FIRST | | | | SECOND | | | | | | | | | | | |
| | OUTPUT OF SELECTOR 5 | | | | | | | | | | | | | | | |
| IF | ΔC 0 | ΔM 0 | ΔY 0 | ΔK 0 | ΔC 1 | ΔM 0 | ΔY 0 | ΔK 0 | ΔC 0 | ΔM 1 | ΔY 0 | ΔK 0 | ΔC 0 | ΔM 0 | ΔY 1 | ΔK 0 |
| $1 > c \geq m \geq y \geq k \geq 0$ | | 1 − c | | | | c − m | | | | | | | | | | |
| $1 > c \geq m \geq k > y \geq 0$ | | 1 − c | | | | c − m | | | | | | | | | | |
| $1 > c \geq y > m \geq k \geq 0$ | | 1 − c | | | | c − y | | | | | | | | | | |
| $1 > c \geq y \geq k > m \geq 0$ | | 1 − c | | | | c − y | | | | | | | | | | |
| $1 > c \geq k > m \geq y \geq 0$ | | 1 − c | | | | c − k | | | | | | | | | | |
| $1 > c \geq k > y > m \geq 0$ | | 1 − c | | | | c − k | | | | | | | | | | |
| $1 > m > c \geq y \geq k \geq 0$ | | 1 − m | | | | | | | | m − c | | | | | | |
| $1 > m > c \geq k > y \geq 0$ | | 1 − m | | | | | | | | m − c | | | | | | |
| $1 > m \geq y > c \geq k \geq 0$ | | 1 − m | | | | | | | | m − y | | | | | | |
| $1 > m \geq y \geq k > c \geq 0$ | | 1 − m | | | | | | | | m − y | | | | | | |
| $1 > m \geq k > c \geq y \geq 0$ | | 1 − m | | | | | | | | m − k | | | | | | |
| $1 > m \geq k \geq y > c \geq 0$ | | 1 − m | | | | | | | | m − k | | | | | | |
| $1 > y > c \geq m \geq k \geq 0$ | | 1 − y | | | | | | | | | | | | | y − c | |
| $1 > y > c \geq k > m \geq 0$ | | 1 − y | | | | | | | | | | | | | y − c | |
| $1 > y \geq m \geq c \geq k \geq 0$ | | 1 − y | | | | | | | | | | | | | y − m | |
| $1 > y \geq m \geq k > c \geq 0$ | | 1 − y | | | | | | | | | | | | | y − m | |
| $1 > y \geq k > m \geq c \geq 0$ | | 1 − y | | | | | | | | | | | | | y − k | |
| $1 > y \geq k > c > m \geq 0$ | | 1 − y | | | | | | | | | | | | | y − k | |
| $1 > k > c \geq m \geq y \geq 0$ | | 1 − k | | | | | | | | | | | | | | |
| $1 > k > c \geq y > m \geq 0$ | | 1 − k | | | | | | | | | | | | | | |
| $1 > k > m \geq c \geq y \geq 0$ | | 1 − k | | | | | | | | | | | | | | |
| $1 > k > m \geq y > c \geq 0$ | | 1 − k | | | | | | | | | | | | | | |
| $1 > k > y \geq c > m \geq 0$ | | 1 − k | | | | | | | | | | | | | | |
| $1 > k > y > m > c \geq 0$ | | 1 − k | | | | | | | | | | | | | | |

| | U(C + ΔC, M + ΔM, Y + ΔY, K + ΔK) TIMING | | | | | | | | | | | | | | | |
|---|---|---|---|---|---|---|---|---|---|---|---|---|---|---|---|---|
| | SECOND | | | | THIRD | | | | | | | | | | | |
| | OUTPUT OF SELECTOR 5 | | | | | | | | | | | | | | | |
| IF | ΔC 0 | ΔM 0 | ΔY 0 | ΔK 1 | ΔC 1 | ΔM 1 | ΔY 0 | ΔK 0 | ΔC 1 | ΔM 0 | ΔY 1 | ΔK 0 | ΔC 1 | ΔM 0 | ΔY 0 | ΔK 1 |
| $1 > c \geq m \geq y \geq k \geq 0$ | | | | | | m − k | | | | | | | | | | |
| $1 > c \geq m \geq k > y \geq 0$ | | | | | | m − k | | | | | | | | | | |
| $1 > c \geq y > m \geq k \geq 0$ | | | | | | | | | | | y − m | | | | | |
| $1 > c \geq y \geq k > m \geq 0$ | | | | | | | | | | | y − k | | | | | |
| $1 > c \geq k > y > m \geq 0$ | | | | | | | | | | | | | | | | k − m |
| $1 > c \geq k > y > m \geq 0$ | | | | | | | | | | | | | | | | k − y |
| $1 > m > c \geq y \geq k \geq 0$ | | | | | | c − y | | | | | | | | | | |
| $1 > m > c \geq k > y \geq 0$ | | | | | | c − k | | | | | | | | | | |
| $1 > m \geq y > c \geq k \geq 0$ | | | | | | | | | | | | | | | | |
| $1 > m \geq y \geq k > c \geq 0$ | | | | | | | | | | | | | | | | |
| $1 > m \geq k > c \geq y \geq 0$ | | | | | | | | | | | | | | | | |
| $1 > m \geq k \geq y > c \geq 0$ | | | | | | | | | | | | | | | | |
| $1 > y > c \geq m \geq k \geq 0$ | | | | | | | | | | c − m | | | | | | |

TABLE 3-continued

| | | | | |
|---|---|---|---|---|
| $1 > y > c \geq k > m \geq 0$ | | c − k | | |
| $1 > y \geq m \geq c \geq k \geq 0$ | | | | |
| $1 > y \geq m \geq k > c \geq 0$ | | | | |
| $1 > y \geq k > m \geq c \geq 0$ | | | | |
| $1 > y \geq k > c > m \geq 0$ | | | | |
| $1 > k > c \geq m \geq y \geq 0$ | k − c | | c − m | |
| $1 > k > c \geq y > m \geq 0$ | k − c | | c − y | |
| $1 > k > m \geq c \geq y \geq 0$ | k − m | | | |
| $1 > k > m \geq y > c \geq 0$ | k − m | | | |
| $1 > k > y \geq c > m \geq 0$ | k − y | | | |
| $1 > k > y > m > c \geq 0$ | k − y | | | |

$U(C + \Delta C, M + \Delta M, Y + \Delta Y, K + \Delta K)$
TIMING

| | THIRD | | | | | | | | | | | | FOURTH | | | |
|---|---|---|---|---|---|---|---|---|---|---|---|---|---|---|---|---|
| | OUTPUT OF SELECTOR 5 | | | | | | | | | | | | | | | |
| IF | ΔC 0 | ΔM 1 | ΔY 1 | ΔK 0 | ΔC 0 | ΔM 1 | ΔY 0 | ΔK 1 | ΔC 0 | ΔM 0 | ΔY 1 | ΔK 1 | ΔC 1 | ΔM 1 | ΔY 1 | ΔK 0 |
| $1 > c \geq m \geq y \geq k \geq 0$ | | | | | | | | | | | | | | | y − k | |
| $1 > c \geq m \geq k > y \geq 0$ | | | | | | | | | | | | | | | | |
| $1 > c \geq y > m \geq k \geq 0$ | | | | | | | | | | | | | | | m − k | |
| $1 > c \geq y \geq k > m \geq 0$ | | | | | | | | | | | | | | | | |
| $1 > c \geq k > m \geq y \geq 0$ | | | | | | | | | | | | | | | | |
| $1 > c \geq k > y > m \geq 0$ | | | | | | | | | | | | | | | | |
| $1 > m > c \geq y \geq k \geq 0$ | | | | | | | | | | | | | | | y − k | |
| $1 > m > c \geq k > y \geq 0$ | | | | | | | | | | | | | | | | |
| $1 > m \geq y > c \geq k \geq 0$ | y − c | | | | | | | | | | | | | | c − k | |
| $1 > m \geq y \geq k > c \geq 0$ | y − k | | | | | | | | | | | | | | | |
| $1 > m \geq k > c \geq y \geq 0$ | | | | | k − c | | | | | | | | | | | |
| $1 > m \geq k \geq y > c \geq 0$ | | | | | k − y | | | | | | | | | | | |
| $1 > y > c \geq m \geq k \geq 0$ | | | | | | | | | | | | | | | m − k | |
| $1 > y > c \geq k > m \geq 0$ | | | | | | | | | | | | | | | | |
| $1 > y \geq m \geq c \geq k \geq 0$ | m − c | | | | | | | | | | | | | | c − k | |
| $1 > y \geq m \geq k > c \geq 0$ | m − k | | | | | | | | | | | | | | | |
| $1 > y \geq k > m \geq c \geq 0$ | | | | | | | | | k − m | | | | | | | |
| $1 > y \geq k > c > m \geq 0$ | | | | | | | | | k − c | | | | | | | |
| $1 > k > c \geq m \geq y \geq 0$ | | | | | | | | | | | | | | | | |
| $1 > k > c \geq y > m \geq 0$ | | | | | | | | | | | | | | | | |
| $1 > k > m \geq c \geq y \geq 0$ | | | | | m − c | | | | | | | | | | | |
| $1 > k > m \geq y > c \geq 0$ | | | | | m − y | | | | | | | | | | | |
| $1 > k > y \geq c > m \geq 0$ | | | | | | | | | y − c | | | | | | | |
| $1 > k > y > m > c \geq 0$ | | | | | | | | | y − m | | | | | | | |

$U(C + \Delta C, M + \Delta M, Y + \Delta Y, K + \Delta K)$
TIMING

| | FOURTH | | | | | | | | | | | | FIFTH | | | |
|---|---|---|---|---|---|---|---|---|---|---|---|---|---|---|---|---|
| | OUTPUT OF SELECTOR 5 | | | | | | | | | | | | | | | |
| IF | ΔC 1 | ΔM 1 | ΔY 0 | ΔK 1 | ΔC 1 | ΔM 0 | ΔY 1 | ΔK 1 | ΔC 0 | ΔM 1 | ΔY 1 | ΔK 1 | ΔC 1 | ΔM 1 | ΔY 1 | ΔK 1 |
| $1 > c \geq m \geq y \geq k \geq 0$ | | | | | | | | | | | | | | | | k |
| $1 > c \geq m \geq k > y \geq 0$ | k − y | | | | | | | | | | | | | | | y |
| $1 > c \geq y > m \geq k \geq 0$ | | | | | | | | | | | | | | | | k |
| $1 > c \geq y \geq k > m \geq 0$ | | | | | k − m | | | | | | | | | | | m |
| $1 > c \geq k > m \geq y \geq 0$ | m − y | | | | | | | | | | | | | | | y |
| $1 > c \geq k > y > m \geq 0$ | | | | | y − m | | | | | | | | | | | m |
| $1 > m > c \geq y \geq k \geq 0$ | | | | | | | | | | | | | | | | k |
| $1 > m > c \geq k > y \geq 0$ | k − y | | | | | | | | | | | | | | | y |
| $1 > m \geq y > c \geq k \geq 0$ | | | | | | | | | | | | | | | | k |
| $1 > m \geq y \geq k > c \geq 0$ | | | | | | | | | k − c | | | | | | | c |
| $1 > m \geq k > c \geq y \geq 0$ | c − y | | | | | | | | | | | | | | | y |
| $1 > m \geq k \geq y > c \geq 0$ | | | | | | | | | y − c | | | | | | | c |
| $1 > y > c \geq m \geq k \geq 0$ | | | | | | | | | | | | | | | | k |
| $1 > y > c \geq k > m \geq 0$ | | | | | k − m | | | | | | | | | | | m |
| $1 > y \geq m \geq c \geq k \geq 0$ | | | | | | | | | | | | | | | | k |
| $1 > y \geq m \geq k > c \geq 0$ | | | | | k − c | | | | | | | | | | | c |
| $1 > y \geq k > m \geq c \geq 0$ | | | | | m − c | | | | | | | | | | | c |
| $1 > y \geq k > c > m \geq 0$ | | | | | c − m | | | | | | | | | | | m |
| $1 > k > c \geq m \geq y \geq 0$ | m − y | | | | | | | | | | | | | | | y |
| $1 > k > c \geq y > m \geq 0$ | | | | | y − m | | | | | | | | | | | m |
| $1 > k > m \geq c \geq y \geq 0$ | c − y | | | | | | | | | | | | | | | y |
| $1 > k > m \geq y > c \geq 0$ | | | | | | | | | y − c | | | | | | | c |
| $1 > k > y \geq c > m \geq 0$ | | | | | c − m | | | | | | | | | | | m |
| $1 > k > y > m > c \geq 0$ | | | | | | | | | m − c | | | | | | | c |

According to the signals from the comparator 4, any one of said sets of signals is selected respectively, and picked up as five coefficient signals. In this case, since c, m, y and k are originally 4-bit signals, each of the thus selected five coefficient signals is also 4 bits. However, only when the following relations hold true, i.e. c=m=y=k=0, the value of $1-c \neq 0$ is equivalent to a binary code $10000 - c_4$ bits = 10000, and becomes a signal of 5 bits.

Each of these registers is connected to respective multipliers 14, 15, 16, 17 and 18. To the multiplier 14 a 5-bit coefficient signal is input from the selector 6, and to the other multipliers 15, 16, 17 and 18, respective 4-bits coefficient signals are to be input from the selector 6.

In the respective multiplier 14–18, each of the coefficient signals is multiplied by each of the additive color separation signals stored in each of the registers 9–13, and the higher 9 bits or 8 bits of those resultant products are added to each other in an adder 19, to which signals from a detail emphasizing circuit (not shown) are also added, in practice.

When carrying is performed to the highest significant position in the higher 9 bits of this resultant product, signals to be output are limited to signals of 8 bits by setting to "1" all lower 8 bits in a limiter 20 followed. These results obtained by the present interpolation are the additive color separation signals of red R, green G and blue B which correspond to those addresses C+c, M+m, Y+y and K+k.

Thus the obtained signals are once stored in a memory (not shown), and the contents of the memory are read out by controlling the access timing therefor and then they are fed to a digital-analog converter (not shown) to generate the final analog output signals for reproducing a picture image on a cathode ray tube monitor or on a color film.

Although the present invention has been described in connection with the four-dimensional interpolation, the present invention may be readily applicable to even higher dimensional interpolations. For example, in five-dimensions, when a point is to be interpolated, having coordinates $(v_i+v_f, w_i+w_f, x_i+x_f, y_i+y_f, z_i+z_f)$ and $v_f \geq w_f \geq x_f \geq y_f \geq z_f$, an interpolated value $U(v,w,x,y,z)$ at the interpolation point is obtained by the following formula, in the same manner as in formula IV:

$$U(v, w, x, y, z) = U(v_i, w_i, x_i, y_i, z_i)(1 - v_f) +$$
$$U(v_{i+1}, w_i, x_i, y_i, z_i)(v_f - w_f) +$$
$$U(v_{i+1}, w_{i+1}, x_i, y_i, z_i)(w_f - x_f) +$$
$$U(v_{i+1}, w_{i+1}, x_{i+1}, y_i, z_i)(x_f - y_f) +$$
$$U(v_{i+1}, w_{i+1}, x_{i+1}, y_{i+1}, z_i)(y_f - x_f) +$$
$$U(v_{i+1}, w_{i+1}, x_{i+1}, y_{i+1}, z_{i+1})z_f.$$

In this embodiment, the formula is composed of 6 terms. When the dimension is increased by one, one more term is added, therefore the present invention can be carried out at high speed.

Although the present invention has been described in some detail by way of illustration and example, for purposes of clarity of understanding it will, of course, be understood that various changes and modifications of the parts are possible without departing from the scope of the present invention.

What is claimed is:

1. A linear interpolation method for converting a first set of n (n≧4) first data signals, each representing a predetermined value having an integer part and a decimal part, into a corresponding second data signal, representing an interpolated value having an integer part and a decimal part, for use in a color picture processing machine, comprising the steps of:
    (a) forming in computer memory a conversion table comprising an array of second data signal values having integer and decimal parts, each second data signal value being stored at an address the binary code of which corresponds to the integer parts of a set of first data signal values, thereby providing an address defined by n coordinates, a second data signal value being read out of said memory in response to an addressing signal;
    (b) determining, along each of the n coordinates, the consecutive integer values between which lies the corresponding integer value of the corresponding one of said first set of n first data signal values;
    (c) forming $2^n$ sets of n coordinates by forming all combinations of said determined consecutive integer values, said sets representing points in n-dimensional space which define the vertices of an interpolation unit space;
    (d) dividing up said n-dimensional interpolation unit space into n! dissection spaces, the vertices of said dissection spaces being vertices of said interpolation unit space, each of said dissection spaces corresponding to one of the n! possible orders of relative magnitudes of said decimal values of said first set of n first data signals;
    (e) discriminating which of said n-dimensional dissection spaces includes the interpolation point denoted by said predetermined values of said first set of n first data signals, at which interpolation point the value of said corresponding second data signal is to be interpolated; and
    (f) deriving said interpolated value at the interpolation point as a weighted sum of the sets of second data signal values stored at the addresses in computer memory which correspond to the vertices of said dissection space in which said interpolation point is located.

2. A linear interpolation method for converting a first set of n (n≧4) first data signals, each representing a predetermined value having an integer part and a decimal part, into a corresponding set of second data signals, each representing an interpolated value having an integer part and a decimal part, for use in a color picture processing machine, comprising the steps of:
    (a) forming in computer memory a conversion table comprising an array of sets of second data signal values having integer and decimal parts, each set of second data signal values being stored at an address the binary code of which corresponds to the integer parts of a set of first data signal values, thereby providing an address defined by n coordinates, a set of said second data signal values being read out of said memory in response to an addressing signal;
    (b) determining, along each of the n coordinates, the consecutive integer values between which lies the corresponding integer value of the corresponding one of said first set of n first data signal values;
    (c) forming $2^n$ sets of n coordinates by forming all combinations of said determined consecutive integer values, said sets representing points in n-dimensional space which define the vertices of an interpolation unit space;
    (d) dividing up said n-dimensional interpolation unit space into n! dissection spaces, the vertices of said dissection spaces being vertices of said interpolation unit space, each of said dissection spaces corresponding to one of the n! possible orders of relative magnitudes of said decimal values of said first set of n first data signals;

(e) discriminating which of said n-dimensional dissection spaces includes the interpolation point denoted by said predetermined values of said first set of n first data signals, at which interpolation point the values of said corresponding set of second data signals are to be interpolated; and (f) deriving said interpolated values at the interpolation point as a weighted sum of the sets of second data signal values stored at the addresses in computer memory which correspond to the vertices of said dissection space in which said interpolation point is located.

3. A linear interpolation method as defined in claim 2, wherein each set of second data signal values corresponding to one of the vertices of said discriminated dissection space is given a weight corresponding to the ratio of an n-dimensional space whose vertices are the interpolation point and the other vertices of said discriminated dissection space to the n-dimensional space defined by said discriminated dissection space.

4. A linear interpolation method as defined in claim 2, wherein each of said first and second data signals comprises 8 bits.

5. A color conversion apparatus for use in a linear interpolation method, comprising:

(a) means for separating each of (p+q) bits of digital subtractive primary colors such as cyan, magenta, yellow and black into two sets, one set of which is an address signal of p bits of the higher order (for C, M, Y, and K) for calling additive primary color signals and the other is for the lower-order q bits (for c, m, y, and k);

(b) a comparator for comparing relative magnitudes of c, m, y, and k and generating an output signal which is a function of said relative magnitudes;

(c) means for monitoring the output signals of the comparator and determining, as a function of said relative magnitudes, to which of said higher-order address signals C, M, Y, or K a unit value is to be added;

(d) memory means for preliminarily storing additive primary signals corresponding to all combinations of said p bits in the higher-order address signals, and outputting five of said additive primary signals in response to address signals output by said monitoring means;

(e) means for calculating five sets of coefficients $(1-c, 1-m, 1-y, 1-k)$, $(1-m, c-y, c-k, m-k, m-c, y-k, y-c, y-m, k-c, k-m, k-y)$, $(m-y, m-k, m-c, y-k, y-c, y-m, k-c, k-m, k-y, c-m, c-y, c-k)$, $(y-k, y-c, y-m, k-c, k-m, k-y, c-m, c-y, c-k, m-y, m-k, m-c)$ and $(k, c, m, y)$, from the q bits of the lower-order signals and for selecting five of said coefficients as a function of said output signal of the comparator, and outputting signals corresponding to said coefficients, (f) a plurality of multipliers for multiplying each of said coefficient signals by each of the corresponding additive primary color signals read from said memory means, and (g) an adder for adding higher-order bits obtained by the multiplication of said signals in said multipliers.

6. A linear interpolation apparatus for converting a first set of four 8-bit first data signals, each representing a predetermined value having an integer part and a decimal part, into a corresponding 8-bit second data signal, representing an interpolated value having an integer part and a decimal part, for use in a color picture processing machine, comprising:

(a) means for inputting said first set of first data signals;

(b) means for dividing each of said first four data signals by separating the leftmost 4 bits from the rightmost 4 bits, thereby forming a first integer value and a first decimal value in binary code for each first data signal;

(c) memory means having addressing means, said memory means storing an array of 8-bit second data signal values, each second data signal value being stored at a 16-bit address which corresponding to the binary code of one of $2^{16}$ combined integer values of a set of four first data signals;

(d) means for comparing said first decimal values of said first set of first data signals and outputting a control signal as a function of the relative magnitudes determined;

(e) vertex selection means for receiving said control signal and outputting a sequence of five selection signals dependent on the control signal received;

(f) adding means for receiving said first integer values of said first set of first data signals and adding a unit value to selected first integer values in response to each of said series of five selection signals, and then sequentially outputting the five sets of resultant integer values in binary code to said addressing means of said memory means;

(g) register means for sequentially storing five 8-bit second data signal values read out from said memory means in response to receipt by said addressing means of said five sets of resultant integer values;

(h) coefficient selection means for receiving and processing said first decimal values of said first set of first data signals to form and store a set of weighting coefficients, for receiving said control signal, and for selecting and outputting five of said weighting coefficients in binary code as a function of the control signal received, (i) multiplication means for multiplying each of said outputting weighting coefficients by the second data signal value stored in the corresponding one of said registers, and then outputting the resultant products, and (j) addition means for receiving and summing said resultant products.

* * * * *

UNITED STATES PATENT AND TRADEMARK OFFICE
CERTIFICATE OF CORRECTION

PATENT NO. : 4,511,989

DATED : April 16, 1985

INVENTOR(S) : SAKAMOTO

It is certified that error appears in the above-identified patent and that said Letters Patent is hereby corrected as shown below:

Column 5-6, Table 1, after "Discrimination", change $U(X_1 + 1, Y_i + 1,$ to read $--U(X_i + 1, Y_i + 1, --$.

Column 5-6, Table 1, third line of equation, change "1-Xf" to read --1-Zf--.

Column 5, line 38, omit --the--.

Columns 7-8, 9-10, Table 2, last equation in each box, change "1>Zf>Yf>Xf>Xf $\geq$ 0" to --1>Zf>Yf>Xf>Wf$\geq$0--.

Column 18, line 53, change "outputting" to --outputted--.

Signed and Sealed this

Fifteenth Day of July 1986

[SEAL]

Attest:

DONALD J. QUIGG

Attesting Officer

Commissioner of Patents and Trademarks